(12) United States Patent
Tobias et al.

(10) Patent No.: US 11,828,624 B1
(45) Date of Patent: Nov. 28, 2023

(54) PROXIMITY SENSING COMPONENTS EMPLOYING ENHANCED SECURITY COMMUNICATIONS

(71) Applicants: Marc Tobias, Pittsburgh, PA (US); Tobias Bluzmanis, Miramar, FL (US)

(72) Inventors: Marc Tobias, Pittsburgh, PA (US); Tobias Bluzmanis, Miramar, FL (US)

(*) Notice: Subject to any disclaimer, the term of this patent is extended or adjusted under 35 U.S.C. 154(b) by 0 days.

(21) Appl. No.: 17/956,104

(22) Filed: Sep. 29, 2022

Related U.S. Application Data

(60) Provisional application No. 63/388,395, filed on Jul. 12, 2022.

(51) Int. Cl.
- *G01D 5/14* (2006.01)
- *G08B 21/18* (2006.01)

(52) U.S. Cl.
CPC .............. *G01D 5/14* (2013.01); *G08B 21/18* (2013.01)

(58) Field of Classification Search
CPC ........................................................ G01D 5/14
See application file for complete search history.

(56) References Cited

U.S. PATENT DOCUMENTS

| | | | |
|---|---|---|---|
| 5,332,992 A | 7/1994 | Woods | |
| 5,673,021 A | 9/1997 | Woods | |
| 5,812,051 A * | 9/1998 | Talbot | G07C 9/00182 340/12.5 |
| 6,506,987 B1 | 1/2003 | Woods | |
| 6,603,378 B1 | 8/2003 | Collins | |
| 7,023,308 B2 | 4/2006 | Woods | |
| 7,291,794 B2 | 11/2007 | Woods | |
| 7,501,595 B2 * | 3/2009 | Dimig | E05B 85/01 200/61.62 |
| 7,944,334 B2 | 5/2011 | Woods | |
| 8,074,479 B2 | 12/2011 | Harley | |
| 8,648,720 B2 | 2/2014 | Woods | |
| 9,136,070 B2 | 9/2015 | Oetjen | |
| 9,685,289 B1 | 6/2017 | Woods | |
| 9,685,290 B1 | 6/2017 | Hedeen | |
| 9,704,680 B1 | 7/2017 | Hedeen | |
| 9,934,921 B2 | 4/2018 | Hedeen | |
| 10,541,095 B2 | 1/2020 | Woods | |
| 11,069,496 B2 | 7/2021 | Hedeen | |

FOREIGN PATENT DOCUMENTS

JP   2009292256 A   * 12/2009

* cited by examiner

Primary Examiner — Walter L Lindsay, Jr.
Assistant Examiner — Milton Gonzalez
(74) Attorney, Agent, or Firm — Jeffrey A. Proehl; Woods, Fuller, Shultz & Smith, PC

(57) ABSTRACT

A system may include a first security component configured to emanate a signal with an authorizing code, and may have a magnetic field generating device configured to generate a signaling magnetic field including the signal with the authorizing code. The system may also include a second security component configured to wirelessly receive the signal with the authoring code when the second security component is proximate to the signaling magnetic field of the first security component. The second security component may include a magnetic field sensor configured to sense the signal emanating from the magnetic field generating device, and the sensor may be changed between first and second states by a change in the signaling magnetic field.

19 Claims, 5 Drawing Sheets

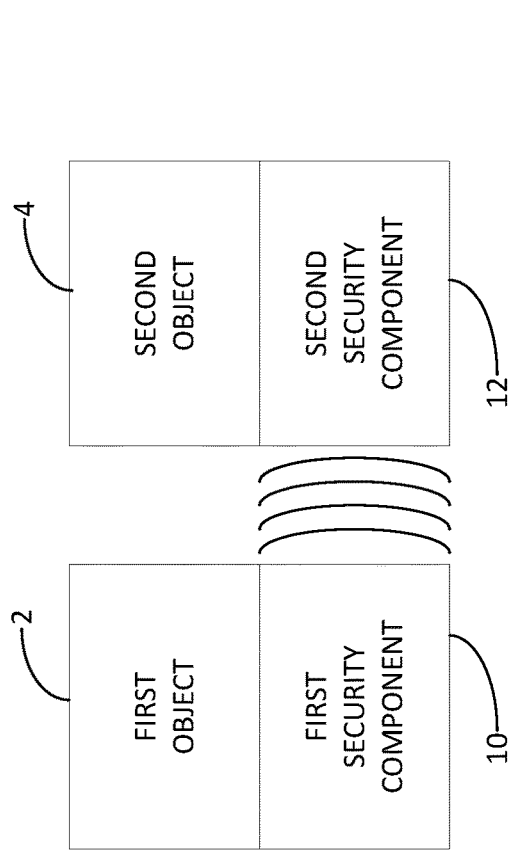
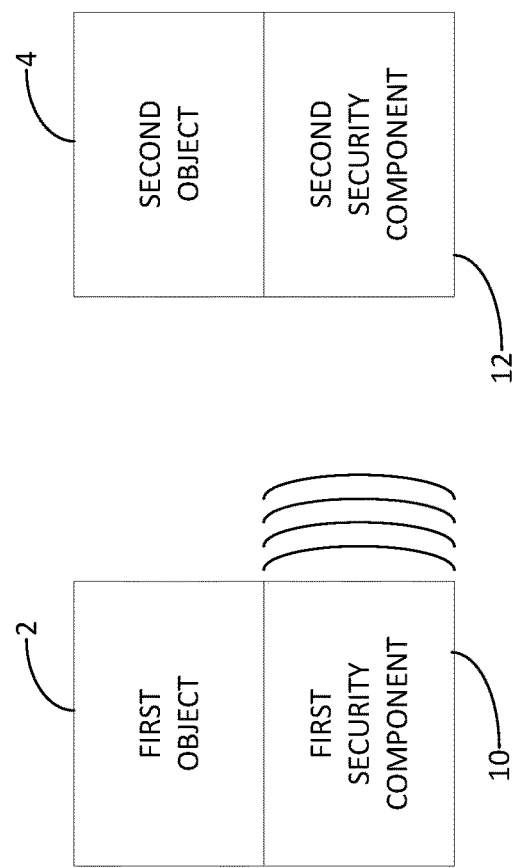
FIG. 1A
FIG. 1B

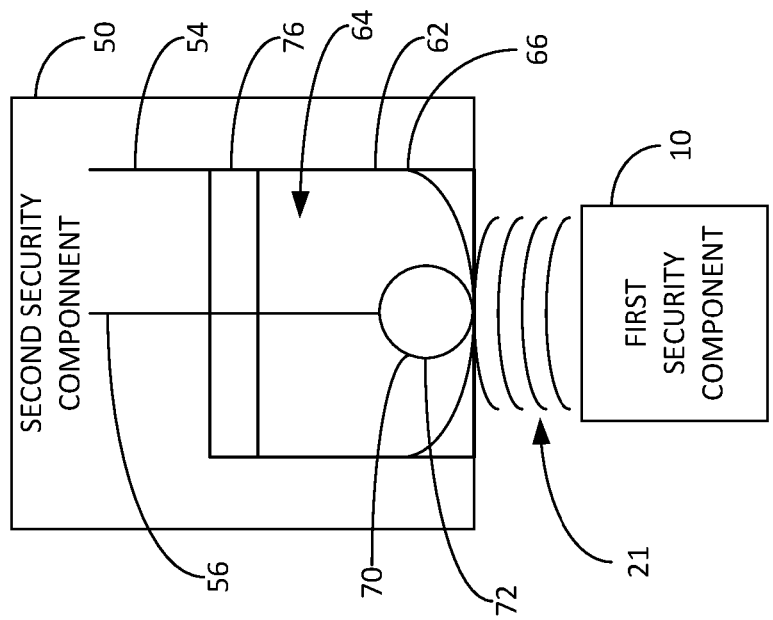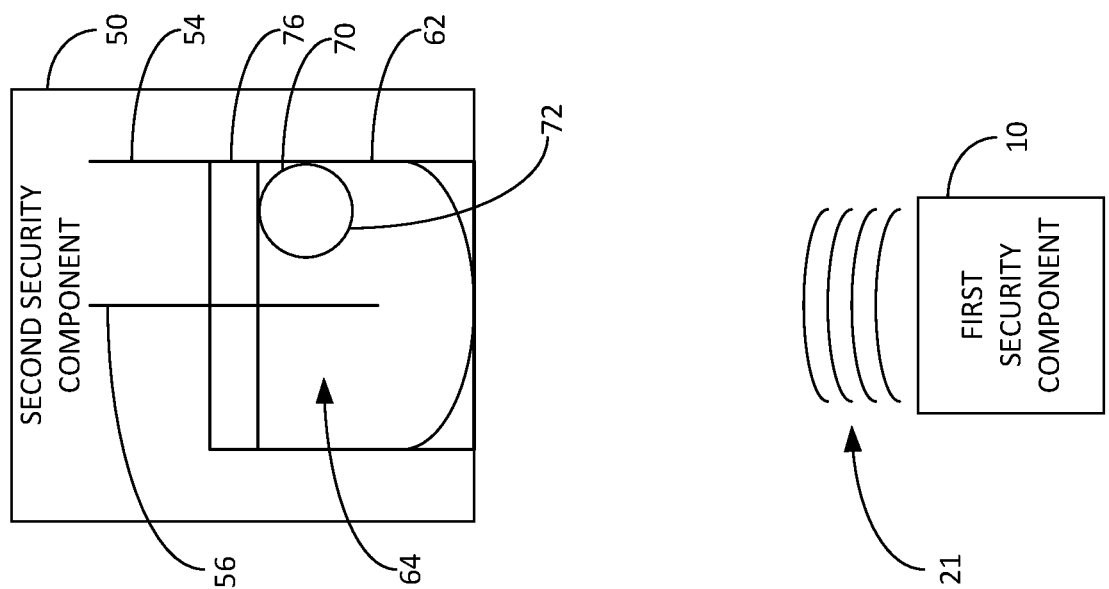

PROXIMITY SENSING COMPONENTS EMPLOYING ENHANCED SECURITY COMMUNICATIONS

REFERENCE TO RELATED APPLICATIONS

This application claims the priority benefit of U.S. Provisional Patent Application No. 63/388,395, filed Jul. 12, 2022, which is hereby incorporated by reference in its entirety.

BACKGROUND

Field

The present disclosure relates to security systems and more particularly pertains to new proximity sensing components employing enhanced security communication for use, for example, in systems providing security in structures such as buildings.

Description of the Prior Art

Security systems associated with a building structure often utilize sensors for detecting the movement or opening of a closure of the building structure, such as movement of a door with respect to the door frame or jamb, or movement of a sash or casement with respect to the window frame. Often, the sensors include two elements or components, with one component being associated with the stationary structure (e.g., the door or window frame), and another component being associated with the movable structure (e.g., the door or window sash).

Conventional designs for the sensors have employed a magnet of one of the components (typically on the movable structure) and a switch of the other one of the components (typically on the stationary structure) that is influenced by the magnet when the components are in close proximity to each other, and not influenced by the magnet when the components are not in close proximity to each other. The switch is used to provide input or a signal to a security system to indicate the proximity, or lack thereof, of the components to each other (or lack thereof) to indicate whether the door or window is in an open or closed condition.

A popular technology utilized for a magnet-based system uses a reed switch with metal contacts whose position with respect to each other may be influenced by the presence or absence of a magnetic field. A "reed" of ferrous metal is moved into (or out of) contact with another piece of metal in order to complete (or interrupt) the continuity of a circuit.

A sensor component incorporating a single reed switch thus can be influenced by a magnetic field regardless of whether the magnetic field is emanating from the other sensor component, and as a result the reed switch of the sensor may be influenced by the presence of another magnet separate of the components of the sensor. The inability to discriminate between the source of the magnetic field can permit spoofing or deceiving the sensor to defeat (for nefarious purposes) the ability of the sensor to detect movement of the sensor components away from each other Various modifications and alterations of the reed switch configuration have been proposed and implemented to diminish the possibility of defeating the ability of the sensor components to detect the proximity of the components to each other. For example, a "balanced magnetic switch" uses several magnets placed in parallel that communicate with corresponding reed switches in arrangements that allow the sensor components to actuate the switch but make it difficult to actuate the switch with a magnet external to the sensor components.

SUMMARY

The present disclosure relates to a system which may comprise a first security component for mounting on a first object and a second security component for mounting on a second object, with the first and second security components being physically discrete from each other and having a proximate condition and a non-proximate condition. The first security component may be configured to emanate a wireless signal with an authorizing code, and may comprise a magnetic field generating device configured to generate a signaling magnetic field including the signal with the authorizing code. The second security component may be configured to wirelessly receive the signal with the authorizing code when the second security component is proximate to the signaling magnetic field of the first security component. The second security component may comprise a magnetic field sensor configured to sense the signal emanating from the magnetic field generating device, with the magnetic field sensor having a first state and a second state and being changed from one said state to the other said state by a change in the signaling magnetic field. The second security component may also comprise a processor in communication with the magnetic field sensor to receive a representation of the signal emanating from the magnetic field generating device to derive a received code from the first component, and the processor may be configured to compare the received code to at least one authorizing code.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present *disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 1A is a schematic diagram of a new system with proximity sensing components employing enhanced security communication showing the second object and second security component in a proximate condition to the first object and first security component, according to an illustrative embodiment.

FIG. 1B is a schematic diagram of a new system with proximity sensing components employing enhanced security communication showing the second object and second security component in a non-proximate condition to the first object and first security component, according to an illustrative embodiment.

FIG. 5A is a schematic diagram of the first security component and second security component at a distance with respect to each other, according to an illustrative embodiment.

FIG. 5B is a schematic diagram of the first security component and second security component in close proximity to each other, according to an illustrative embodiment.

DETAILED DESCRIPTION

Figure 2:
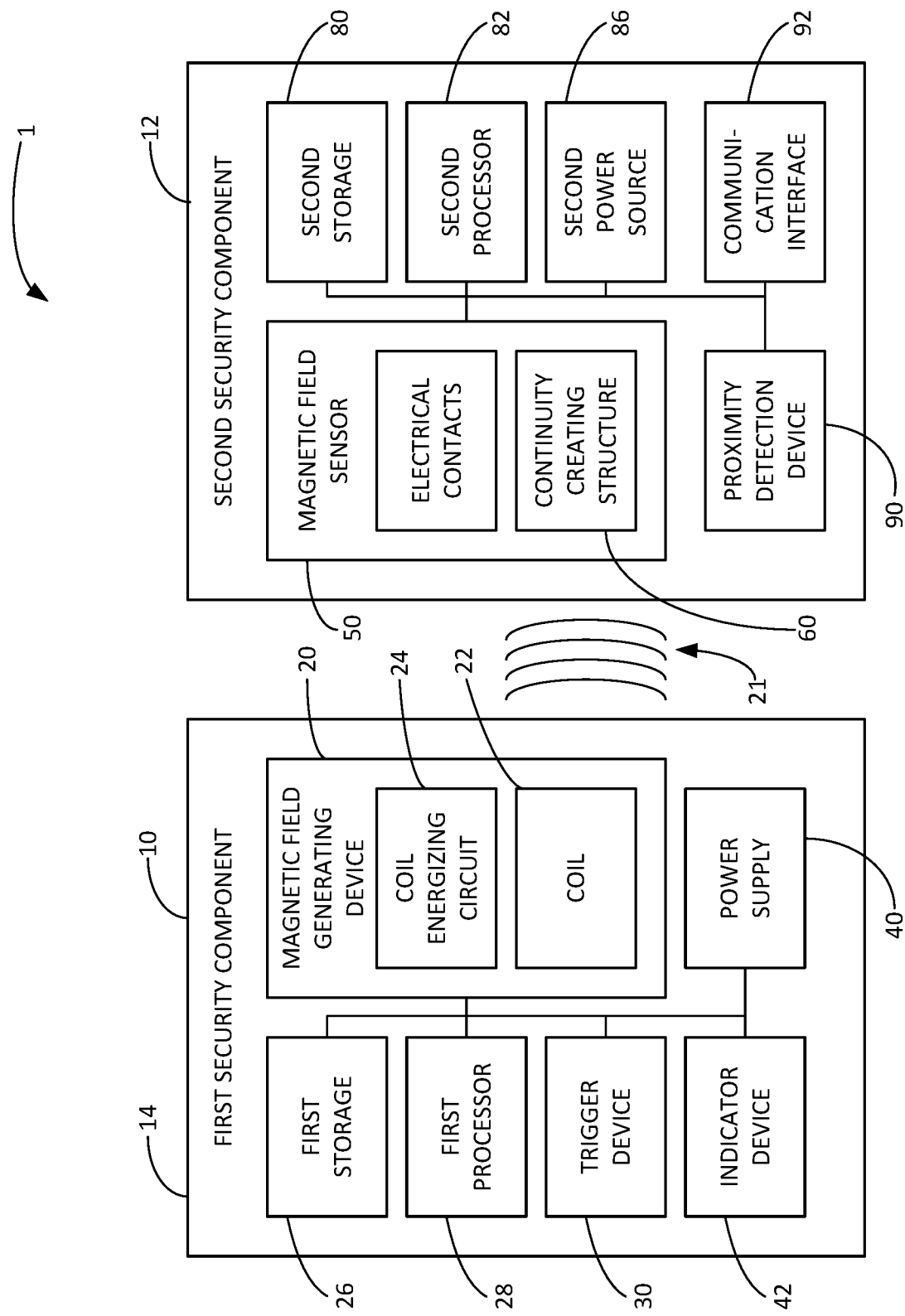
FIG. 2 is a schematic diagram of a new system for transmitting an authorization code from a first security component to a second security component according to the present disclosure.
Figure 4:
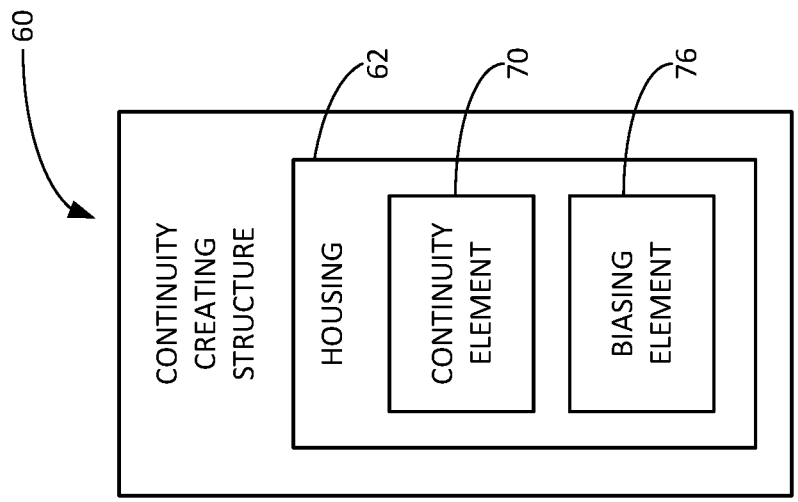
FIG. 4 is a schematic diagram of the continuity creating structure of the second security component of the system, according to an illustrative embodiment.
Figure 3:
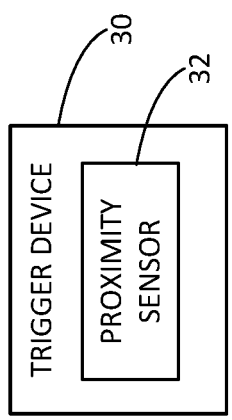
FIG. 3 is a schematic diagram of an illustrative embodiment of a trigger device of the first security component of the system, according to an illustrative embodiment.
Figure 6:
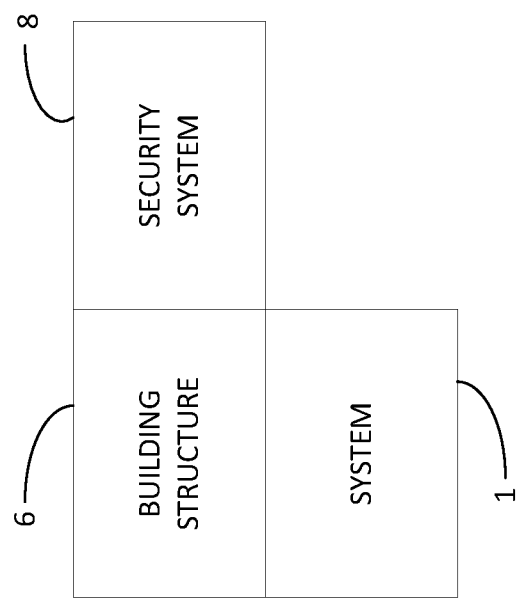
FIG. 6 is a schematic diagram of the system of the disclosure with respect to a building structure and a security system of the building structure, according to an illustrative embodiment

With reference now to the drawings, and in particular to FIGS. 1 through 6 thereof, new proximity sensing components employing enhanced security communication embodying the principles and concepts of the disclosed subject matter will be described.

In light of the drawbacks associated with the use of sensors incorporating reed-type switches, and the relative ease with which an external magnetic field may be utilized to alter the correct operation of sensor components utilizing a reed switch, or the complexity needed in a reed switch-based sensor in order to avoid the defeating of the correct operation, the applicants have developed aspects of a system with greatly increased security against compromise through the use of elements that communicate an authorizing code rather than simply presenting a magnetic field. The authorizing code is communicated between sensor components via a signal in a magnetic field that is not easily duplicated or spoofed in a manner that would allow compromise of the system.

The disclosure relates to a system 1 which in some aspects may include a first object 2 and a second object 4, and the first object may be movable with respect to the second object. In some implementations, the second object 4 may be a relatively stationary object while the first object 2 may be a relatively movable object. In illustrative embodiments, the first and second objects may be elements of a building structure 6, and the second object 4 may comprise a frame which defines an opening in the structure and the first object 2 may comprise a closure for the opening in the structure. For example, the second object 4 may comprise a door frame and the first object 2 may comprise a door, and in another example, the second object 4 may comprise a window frame and the first object comprising a window sash.

In a broad sense, the system 1 may include, or be associated with, a security system 8 configured to monitor the security status of the building structure 6, and in particular unauthorized or unexpected movements of one of the objects 2, 4 with respect to the other one of the objects 2, 4. For example, the opening movement of a door of a building structure 6 in the associated door opening formed by a frame or jamb, or the opening movement of a window sash in a window frame, may be sensed and monitored for the purpose of providing an alert in the case where it is determined that opening movement of the closure was not authorized or expected.

In some aspects, the system 1 may include a first security component 10 and a second security component 12, and the first and second security components may be physically discrete from each other, such that they are not physically connected to each other and independent of each other. The first and second components 10, 12 may be movable with respect to each other such that the components may be moved away from each other and toward each other. The first and second security components 10, 12 may have a proximate condition and a non-proximate condition relating to the relative physical proximity or closeness of the components to each other. The proximate condition of the components 10, 12 may be characterized by the first and second security components being physically proximate or relatively close or closer to each other, but may not necessarily be in contact with each other. The non-proximate condition of the components 10, 12 may be characterized by the first and second security components being separated from each other by a distance which may be greater than a threshold distance.

In embodiments, the first security component 10 may be associated with one of the first and second objects 2, 4 and the second security component 12 may be associated with another one of the first and second objects. In the illustrative embodiments of this disclosure, the first security component 10 may be associated with the first object 2 and the second security component 12 may be associated with the second object 4. Illustratively, the first security component may be mounted on the first object 2 and the second security component 12 may be mounted on the second object 4.

The first security component 10 may be configured to emanate a wireless signal with an authorizing code, which may be a unique authorizing code but may also be less than unique in some applications. The emanation of the signal by the first security component may permit another element, such as the second security component 12, to receive the wireless signal and perceive the authorizing code.

In embodiments, the first security component 10 may comprise a case 14 on which elements of the first security component may be mounted. The case 14 may define a case interior in which some or all elements of the first security component may be positioned.

The first security component 10 may further include a magnetic field generating device 20 which is configured to emanate a signal from the first security component. The signal may include or encode the authorizing code associated with the security component 10. The magnetic field generating device 20 is typically configured to generate a signaling magnetic field 21 that generally extends outwardly from the generating device 20, and the case 14 of the component. The signaling magnetic field 21 may extend a distance from the case 14 of the component that is substantially equal to the threshold distance, and may not extend beyond the threshold distance. As such, movement of at least portions of the second security component 12 into a proximity less than the threshold distance may place the component 12 in the field 21.

The signal may be include fluctuations or oscillations or variations in the magnetic field, such as in the magnitude of the field strength of the magnetic field generated by the magnetic field generating device. The oscillations or variations may encode the authorizing code for communicating the code wirelessly to other objects, such as the second component 12. Illustratively, the oscillations or variations in the signal may produce a stream of pulses in the magnetic field which contain information such as the authorizing code. Illustratively, elements of the magnetic field generating device 20 may be mounted on, and positioned in the interior of the case 14.

In some embodiments, the magnetic field generating device 20 may include a coil 22 configured to carry an electrical current, and which may generate emanate the signaling magnetic field when the electrical current is passed through the coil. The generating device may further include a coil energizing circuit 24 configured to energize the coil 22 to produce the signal magnetic field, and the energizing circuit may be configured to energize the coil in a manner indicative of the authorizing code. The coil energizing circuit 24 may be configured to selectively energize and de-energize the coil to indicate the code, such as in a binary (e.g., on and off, high and low, etc.) form.

The first security component 10 may further include a first storage 26 configured to store data such as the authorizing codes, and illustratively the unique authorizing code, associated with the first security component. Illustratively, the first storage 26 may be mounted on the case, such as in the interior.

The first security component 10 may further include a first processor 28 in communication with the magnetic field generating device 20 to cause the generating device to emanate a signal with the authorizing code. The first processor 28 may also be in communication with the first storage 26 to communicate the unique authorizing code to the processor 28 for communicating to the generating device 20. The first processor 28 may or specifically be in communication with the coil energizing circuit 24 of the field generating device.

The first security component 10 may further include a trigger device 30 for causing the magnetic field generating device to emanate the signal, and in some embodiments the trigger device may be influenced by a condition external to the first security component to cause the emanation of the signal. The trigger device may be in communication with the first processor 28 to cause the first processor to cause the magnetic field generating device 20 to emanate the signal. Illustratively, the trigger device 30 may comprise a proximity sensor 32 which is configured to sense the proximity of the second security component 12 to the first component 10.

The first security component 10 may further include a power supply 40 for suppling power to elements of the first security component 10, and may comprise an electrical power source such as a battery which may be rechargeable, or else replaceable. Also, the first security component 10 may include an indicator device 42 for indicating a status condition of the first security component 10, such as, for example, a status condition in which the signal is being emanated or wirelessly transmitted by the magnetic field generating device.

In embodiments, the second security component 12 may be configured to wirelessly receive the signal from the first security component 10 when the first security component and the second security component are in the proximate condition with respect to each other. Conversely, the second security component 12 may be configured to not wirelessly receive the signal from the first security component 10 when the first and second security components are in the non-proximate condition with respect to each other. In some embodiments, the second security component 12 may be configured to receive the signal when the component 12 is at least partially in the signaling magnetic field 21 of the first security component 10. The second security component 12 may be configured to receive an authorizing code, such as a unique authorizing code, via the signal.

In illustrative embodiments, the second security component 12 may comprise a magnetic field sensor 50 configured to sense the signal emanating from the magnetic field generating device 20 of the first security component. The magnetic field sensor 50 may be characterized by having a first state and a second state, and the sensor 50 may be biased toward one of the states. Significantly, the magnetic field sensor 50 may be changed from one of the states to the other one of the states by fluctuations or oscillations in the magnitude of the field strength of the magnetic field generating device 20 of the first security component. The magnetic field sensor 50 may be biased toward one of the states, and illustratively the sensor 50 may be biased toward the first state. Optionally, the magnetic field sensor 50 may be biased toward the second state.

In greater detail, the magnetic field sensor 50 may comprise a pair of electrical contacts 54, 56 and a continuity creating structure 60 configured to create and remove electrical continuity between the electrical contacts. The continuity creating structure 60 may include a housing 62 which may define an interior chamber 64 and have an exterior 66. The pair of contacts 54, 56 may be mounted on the housing, and at least a portion of each of the electrical contacts may be exposed on the exterior 66 of the housing. In some embodiments, the housing 62 may be in electrical continuity with the first electrical contact 54 and the housing may be electrically isolated from the second electrical contact 56.

The magnetic field sensor 50 may include a continuity element 70 may be configured to alternately provide and remove continuity between the first and second electrical contacts 54, 56. The continuity element 70 may be positioned in the interior chamber 64 of the housing, and may be movable in the chamber 64 between one or more continuity positions and one or more discontinuity positions. In the illustrative embodiments, the one or more continuity positions of the continuity element 70 may correspond to the first state of the magnetic field sensor 50, and the one or more discontinuity positions may correspond to the second state of the magnetic field sensor.

The continuity element 70 may be magnetically receptive such that the element is influenced by a magnetic field, and may be biased to move toward a source of the magnetic field. Illustratively, the continuity element 70 may be biased to move toward the source of the magnetic field, such as the magnetic field generating device 20. Illustratively, the continuity element 70 may be formed of a ferrous material. The continuity element 70 may be electrically conductive such that the element is able to conduct electricity, and an outer surface 72 of the element may be electrically conductive and formed of a conductive material. Illustratively, the outer surface 72 of the continuity element may have a spherical shape.

The magnetic field sensor 50 may also comprise a biasing element 76 for biasing the continuity element toward one or more positions that correspond to one of the states of the magnetic field sensor 50. The biasing element 76 may further bias the continuity element 76 away from one or more positions corresponding to another one of the states of the magnetic field sensor. For example, in embodiments, the biasing element 76 is positioned on the housing 62 to urge the continuity element 70 toward the continuity positions. In such embodiments, the biasing element 76 may be positioned on the housing 62 to urge the continuity element away from the discontinuity positions. As a further example, in further embodiments, the biasing element 76 is positioned on the housing 62 to urge the continuity element 70 toward the discontinuity positions. In such embodiments, the biasing element 76 may be positioned on the housing 62 to urge the continuity element away from the continuity positions.

The biasing element 76 may be configured to produce a magnetic field to cause the biasing of the continuity element 70 into one of the states, and may be formed of a magnetic material. Advantageously, the influence of the signaling magnetic field 21 of the magnetic field generating device 20 is able to overcome or exceed the influence of the magnetic field of the biasing element 76 on the continuity element 70, when the first security component 10 is sufficiently proximate to the second security component 12.

Some highly suitable devices for providing the functionality of the magnetic field sensor 52 is disclosed in, for example, U.S. Pat. No. 7,023,308 of Randall Woods, which is hereby incorporated by reference in its entirety. Suitable devices for performing the function of the magnetic field sensor may be commercially available from Magnasphere Corporation of Waukesha, WI.

The second security component 12 may further include a second storage 80 which is configured to store at least one authorizing code including one or more "authorized" authorizing code or codes for comparing to the received code (or code received from the first security component 10 via the magnetic field sensor 50), and may be incorporated with the second security component 12. A second processor 82 may be in communication with the magnetic field sensor 52 receive a representation of the signal emanating from the magnetic field generating device 20 of the first security component 10 to derive a received code from the component 10. The second processor 82 may also be in communication with the second storage 80 to access one or more of the authorizing codes stored in the storage 80. The second processor 82 may be configured to compare the received code to the one or more authorizing codes corresponding to an authorized authorizing code rather than an unauthorized authorizing code or other unknown code.

The second security component 12 may further include a second power source 86 which is configured to provide electrical power to elements of the second security component 10. Illustratively, the second power source 86 may be configured to provide electrical power to the magnetic field sensor 50, the second storage 80, and the second processor 82, as well as a communication interface 84 as necessary.

In some of the limitations, the second security component 12 may further include a proximity detection device 90 configured to detect movement of second security component 12 with respect to the first security component 10, such as by detecting a change in the proximity of the first security component with respect to the second security component. In embodiments, the proximity detection device 90 in the second security component may be triggered by detection of the presence of a magnetic field, such as the signaling magnetic field 21 of the magnetic field generating device of the first security component. Illustratively, the proximity detection device 90 may be triggered by detection of a change in the status of the presence of the magnetic field. For example, the proximity detection device 90 may be triggered by a discontinued detection of the presence of the signaling magnetic field 21 and/or may be triggered by an initial (or new) detection of the presence of the signaling magnetic field 21.

As a result, the proximity detection device 90 may be triggered by the first and second security components 10, 12 moving out of proximity with respect to each other, potentially indicating that the first and second objects 2, 4 have moved away from each other and potentially indicating that a closure (e.g., door or window) of the structure has been opened. Additionally, or alternatively, the proximity detection device 90 may be triggered by the first and second security components 10, 12 moving into proximity with respect to each other, potentially indicating that the first and second objects 2, 4 have moved toward each other and potentially indicating that a closure (e.g., door or window) of the structure has been closed.

The proximity detection device 90 may be configured initiate sensing by the magnetic field sensor 50 of the second security component such that the magnetic field sensor 50 is not required to operate continuously, but intermittently as initiated by the proximity detection device. The detection device 90 may be in communication with the second processor 82 such that the proximity detection device may provide a signal to the processor 82 indicative of the status of the proximity of the components 10, 12, (e.g., a change in the status), and the processor 82 may initiate operation of the magnetic field sensor 50. Illustratively, the second processor 82 may permit power from the second power source 86 to energize elements of the second security component 20 such as the magnetic field sensor.

In operation, comparison between the received code and the one or more authorized authorizing codes may be made by the second processor 82 at various occasions, including when the proximity detection device 90 has initiated sensing by the field sensor 50 and a received code is initially received, and at various times such as at uniform or varied integrals or substantially continuously as a signal or received code is available, for example, from the magnetic field sensor 50 or other elements of the second security component.

In some embodiments, the second security component 12 may additionally include a communication interface 92 which is configured to communicate with another element, such as the security system 8. The communication interface 92 may be configured to communicate reception of an authorized authorizing code by the second security component, such as by communication with the security system 8. Communication by the communication interface 92 may be periodic based upon uniform or non-uniform intervals, or episodic based upon initiating events or occurrences. In some embodiments, the communication interface 92 may be configured to communicate a signal by wire, while in other embodiments the communication interface may be configured to transmit a signal wirelessly.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system comprising:
a first security component for mounting on a first object and a second security component for mounting on a second object, the first and second security components being physically discrete from each other and having a proximate condition and a non-proximate condition;
wherein the first security component is configured to emanate a wireless signal encoding an authorizing code, the first security component comprising:
a magnetic field generating device configured to generate a signaling magnetic field, the signaling magnetic field generated by the generating device including the signal encoding the authorizing code;
wherein the second security component is configured to wirelessly receive the signal with the authorizing code when the second security component is proximate to the first security component in the proximate condition such that the second security component is located in the signaling magnetic field of the first security component, the second security component comprising:
a magnetic field sensor configured to sense the signal emanating from the magnetic field generating device, the magnetic field sensor having a first state and a second state, the magnetic field sensor being changed from one said state to the other said state by a change in a magnitude of a field strength of the signaling magnetic field;
a processor in communication with the magnetic field sensor to receive a representation of the signal emanating from the magnetic field generating device to derive a received code from the first component, the processor being configured to compare the received code to at least one authorizing code; and
a communication interface configured to communicate reception of an authorized authorizing code by the second security component.

2. The system of claim 1 wherein the signal emanating from the magnetic field generating device includes oscillations in the magnitude of the field strength of the magnetic field generated by the magnetic field generating device, the oscillations in the magnitude of the field strength encoding the authorizing code.

3. The system of claim 2 wherein the magnetic field sensor is changed from one said state to the other said state by the oscillations in the magnitude of the field strength of the magnetic field generating device.

4. The system of claim 1 wherein the magnetic field generating device includes:
a coil configured to carry an electrical current; and
a coil energizing circuit configured to energize the coil to produce the signal, the coil energizing circuit being configured to selectively energize and de-energize the coil to indicate the authorizing code.

5. The system of claim 1 wherein the first security component includes a trigger device for causing the magnetic field generating device to emanate the signal, the trigger device being influenced by a condition external to the first security component to cause the emanation of the signal.

6. The system of claim 1 wherein the first state of the magnetic field sensor provides electrical continuity between electrical contacts and the second state exhibits electrical discontinuity between the electrical contacts.

7. The system of claim 1 wherein the magnetic field sensor comprises:
a pair of electrical contacts including first and second electrical contacts; and
a continuity creating structure configured to create and remove electrical continuity between the electrical contacts based upon the change in the magnitude of the field strength of the signaling magnetic field.

8. The system of claim 7 wherein the continuity creating structure includes a continuity element configured to alternately create and remove continuity between the first and second electrical contacts, the continuity element being movable between one or more continuity positions and one or more discontinuity positions, the one or more continuity positions of the continuity element corresponding to the first state of the magnetic field sensor, the one or more discontinuity positions corresponding to the second state of the magnetic field sensor.

9. The system of claim 8 wherein the continuity element is magnetically receptive such that the continuity element is influenced by the signaling magnetic field.

10. The system of claim 9 wherein the continuity element is magnetically urged to move toward a source of the signaling magnetic field.

11. The system of claim 9 wherein the continuity element is electrically conductive such that the element is able to conduct electricity.

12. The system of claim 11 wherein the continuity creating structure includes a biasing element biasing the continuity element toward the one or more positions corresponding to one of the states of the magnetic field sensor.

13. The system of claim 12 wherein the biasing element biases the continuity element away from one or more positions corresponding to another one of the states of the magnetic field sensor.

14. The system of claim 13 wherein the biasing element produces a magnetic field, the influence of the signaling magnetic field of the magnetic field generating device on the continuity element being able to overcome the influence of the magnetic field of the biasing element on the continuity element.

15. The system of claim 1 wherein the communication interface is configured to communicate with a security system.

16. A system comprising:
a first security component for mounting on a first object and a second security component for mounting on a second object, the first and second security components being physically discrete from each other and having a proximate condition and a non-proximate condition;
wherein the first security component is configured to emanate a wireless signal encoding an authorizing code, the first security component comprising:
a magnetic field generating device configured to generate a signaling magnetic field, the signaling magnetic field generated by the generating device including the signal encoding the authorizing code, the signal emanating from the magnetic field generating device including oscillations in a magnitude of a field strength of the magnetic field generated by the magnetic field generating device, the oscillations in the magnitude of the field strength encoding the authorizing code;
wherein the second security component is configured to wirelessly receive the signal with the authorizing code when the second security component is proximate to the first security component in the proximate condition such that the second security component is located in the signaling magnetic field of the first security component, the second security component comprising:
a magnetic field sensor configured to sense the signal emanating from the magnetic field generating device, the magnetic field sensor having a first state and a second state, the magnetic field sensor being changed from one said state to the other said state by oscillations in the magnitude of the field strength of the signaling magnetic field;
wherein the magnetic field sensor comprises:
a pair of electrical contacts including first and second electrical contacts; and
a continuity creating structure configured to create and remove electrical continuity between the electrical contacts based upon a change in the magnitude of the field strength of the signaling magnetic field, the continuity creating structure including:
a continuity element configured to alternately create and remove continuity between the first and second electrical contacts, the continuity element being movable between one or more continuity positions and one or more discontinuity positions, the one or more continuity positions of the continuity element corresponding to the first state of the magnetic field sensor, the one or more discontinuity positions corresponding to the second state of the magnetic field sensor, the continuity element being magnetically receptive such that the continuity element is influenced by the signaling magnetic field, the continuity element being magnetically urged to move toward a source of the signaling magnetic field, the continuity element being electrically conductive such that the element is able to conduct electricity;
a biasing element biasing the continuity element toward the one or more positions corresponding to one of the states of the magnetic field sensor, the biasing element being configured to bias the continuity element away from one or more positions corresponding to another one of the states of the magnetic field sensor, the biasing element producing a magnetic field, the influence of the signaling magnetic field of the magnetic field generating device on the continuity element being able to overcome the influence of the magnetic field of the biasing element on the continuity element.

17. The system of claim 16 wherein the first state of the magnetic field sensor provides electrical continuity between electrical contacts and the second state exhibits electrical discontinuity between the electrical contacts.

18. The system of claim 16 wherein the second security component includes a processor in communication with the magnetic field sensor to receive a representation of the signal emanating from the magnetic field generating device to derive a received code from the first component, the processor being configured to compare the received code to at least one authorizing code.

19. The system of claim 16 wherein the second security component includes a communication interface configured to communicate reception of an authorized authorizing code by the second security component, the communication interface being configured to communicate with a security system.

\* \* \* \* \*